Nov. 21, 1972  H. CHARNOCK ET AL  3,703,424
METHOD OF PRODUCING A WEAR-RESISTANT AREA
IN A SURFACE-COVERING MATERIAL
Filed July 23, 1969  4 Sheets-Sheet 1

3,703,424
METHOD OF PRODUCING A WEAR-RESISTANT AREA IN A SURFACE-COVERING MATERIAL
Harry Charnock, Westhoughton, and David E. Bowker, Atherton, England, assignors to Dunlop Holdings Limited
Filed July 23, 1969, Ser. No. 843,964
Claims priority, application Great Britain, July 30, 1968, 36,323/68
Int. Cl. C09j 5/00
U.S. Cl. 156—272          7 Claims

ABSTRACT OF THE DISCLOSURE

A wear-resistant area is produced in a surface-covering material, e.g. a car carpet, having a pile of thermoplastic flock fibres by subjecting the pile to heat and pressure in an area corresponding to the desired wear-resistant area to fuse the fibres in that area and cooling to set the fused material.

---

This invention relates to surface-covering material and particularly to floor-covering material, for example, car carpets, which have a pilous surface of fibrous flock. The invention relates, in particular, to such surface-covering material having areas of high wear-resistance, and abrasion-resistance, and to a method and apparatus for the manufacture of such surface-covering material.

The invention in one aspect provides a method of producing a wear-resistant area in a surface-covering material having a pile of thermoplastic flock fibers, in which the pile is subjected to heat and pressure in an area corresponding to the desired wear-resistant area to fuse the fibres in that area.

The invention also provides surface-covering material having a pile of thermoplastic flock fibres and having at least one wear-resistant area in that surface produced by the method specified above.

Any suitable thermoplastic material that can be fused and subsequently cooled to give a coherent surface layer may be used for the fibrous flock. A particularly suitable material is nylon.

The surface-covering material will normally comprise a backing material onto which the thermoplastic flock fibres have been adhered. The backing material may be any suitable material conventionally used and typical examples are foamed or non-foamed rubber compositions, textile materials such as Hessian-backed felt etc.

Heat and pressure are conveniently applied to the area to be treated by means of a heated shoe-plate. The cooling of the thermoplastic material in the treated area may be accelerated, if desired, by bringing it into contact with a cooled shoe-plate, e.g. a shoe-plate which is hollow and water cooled.

The invention is particularly useful for the manufacture and provision of car carpets. Such carpets have a number of areas which are subjected to considerable wear and abrasion during use, these areas including the portions where the car seat runners contact the carpet and the areas beneath the driver's feet.

The durability of the wear-resistant area may be further enhanced by laying a sheet of thermoplastic material over the area of the pile to be treated, so that when the area is subjected to heat and pressure the thermoplastic sheet and the pile fuse together to form, on cooling, a continuous surface. The wear-resistance of the treated area is thus increased as compared with a similar area where only the pile has been fused, since the volume of thermoplastic material in the treated area is increased. Any suitable thermoplastic sheet material can be used, a particularly suitable material being nylon felt.

In a further embodiment of the invention there is provided an apparatus for carrying out the method of the invention. The apparatus comprises a base on which the flocked material is laid, a shoe-plate located to correspond with the desired wear-resistant area in the pile, means to heat the plate and/or flock, and means to bring the plate in and out of pressured contact with the pile.

The means for bringing the shoe-plate into contact with the pile may conveniently be, for example, a piston moving within a cylinder and operated by, for example, air pressure. The apparatus may comprise one shoe-plate or a plurality of shoe-plates.

In certain instances it may be found necessary to insert an intermediate layer between the pile surface of the surface-covering material and the shoe-plates of the apparatus. This may be necessary to prevent the flock fibres from adhering to the shoe-plates under heat and pressure. The intermediate layer may be of any material which has sufficiently good non-stick properties to prevent it from adhering to either the flock fibres or the shoe-plate under the operating conditions. Suitable examples are silicone-surfaced glass cloth or an aluminium plate having a surface coating of a silicone release fluid. When an aluminium plate is used this may be provided with a ribbed surface to produce a ribbed pattern in the wear-resistant area.

The present invention has a number of advantages over the previously practiced methods of providing wear-resistant areas on flock-coated materials. For example, it is known to provide separate abrasion-resistant materials to cover these areas of heavy wear and to attach them to the flock-coated surface by means of rivets, staples, press studs, adhesives or by welding. For example, in one conventional method, strips of polyvinyl chloride are attached to the flock surface in the desired positions by means of a high frequency welding machine. Application of the high frequency to the edges of P.V.C. strip fuses the edges and thereby adheres them to the flock.

This high frequency or R.F. welding technique is a sensitive one requiring specialised knowledge in the event of breakdown. It has also been found that a high scrap rate using R.F. methods occurs when car mats with felt backing are being processed as scorching and burning of the felt takes place. The adhesion between the P.V.C. and the nylon is also of low order.

The present invention eliminates the need for separate abrasion-resistant materials and all the associated means of attachment including the R.F. welding machine, and eliminates scrap. Should there be any faults in the continuous thermoplastic surface forming the wear-resistant area according to the invention, for example, should the surface prove to be porous, it is possible to sprinkle the area with further thermoplastic flock fibres, or even powder, and then to re-process the area.

By using this latter technique, i.e. adding further thermoplastic flock or powder, it is possible to provide an area of contrasting colour, by sprinkling the area with, for example, nylon flock fibres of a different colour and then fusing and cooling these additional fibers.

The invention is not restricted to areas that are rectangular in shape, and the periphery of the shoe-plate may be varied to give any number of different shapes, and their position can be changed by movement of the air cylinders on the apparatus. It is possible, for example, to produce a nylon carpet square with wording embedded in the pile surface, and a contrasting colour may be used to accentuate the wording.

It will be apparent that as well as processing individual carpets, it is possible to process a continuous length of carpet by arranging the speed of pull-through so that the carpet is processed in the required positions and then cut to size afterwards.

Specific forms of apparatus, suitable for the manufacture of car carpets, and examples illustrating the invention, will now be described with reference to the accompanying drawings.

Figure 2:
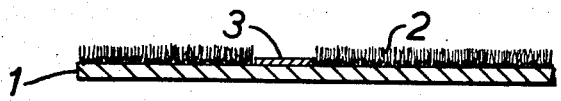
FIG. 2 is a section along line II—II of FIG. 1.
Figure 1:
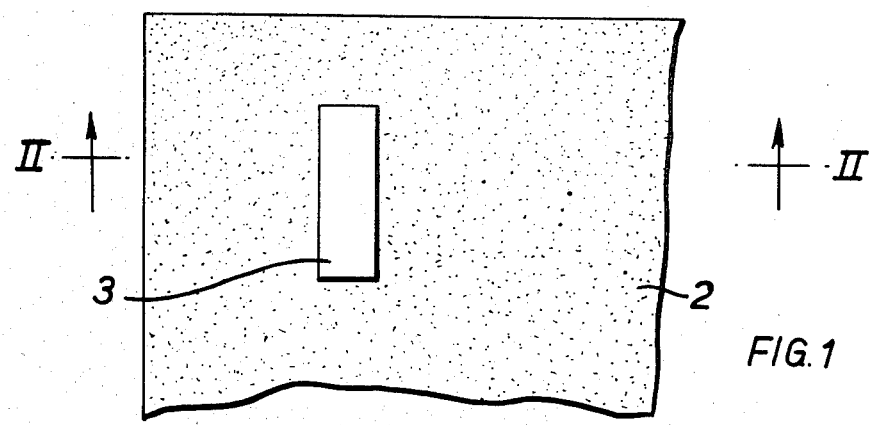
FIG. 1 is a plan view of a portion of a car carpet showing one wear-resistant area.

Referring to FIGS. 1 and 2, the carpet has a backing material 1, having a pile surface of nylon flock 2 and a wear-resistant area 3 of solid nylon.

The wear-resistant layer 3 is produced by the application of heat, under pressure, to an area of the pile so that the nylon fibres in that area are melted and compressed. The heat source is then removed and, on cooling, the area is seen to be a solid nylon mass embedded just below the free ends of the nylon fibres of the remainder of the carpet.

Figure 3:
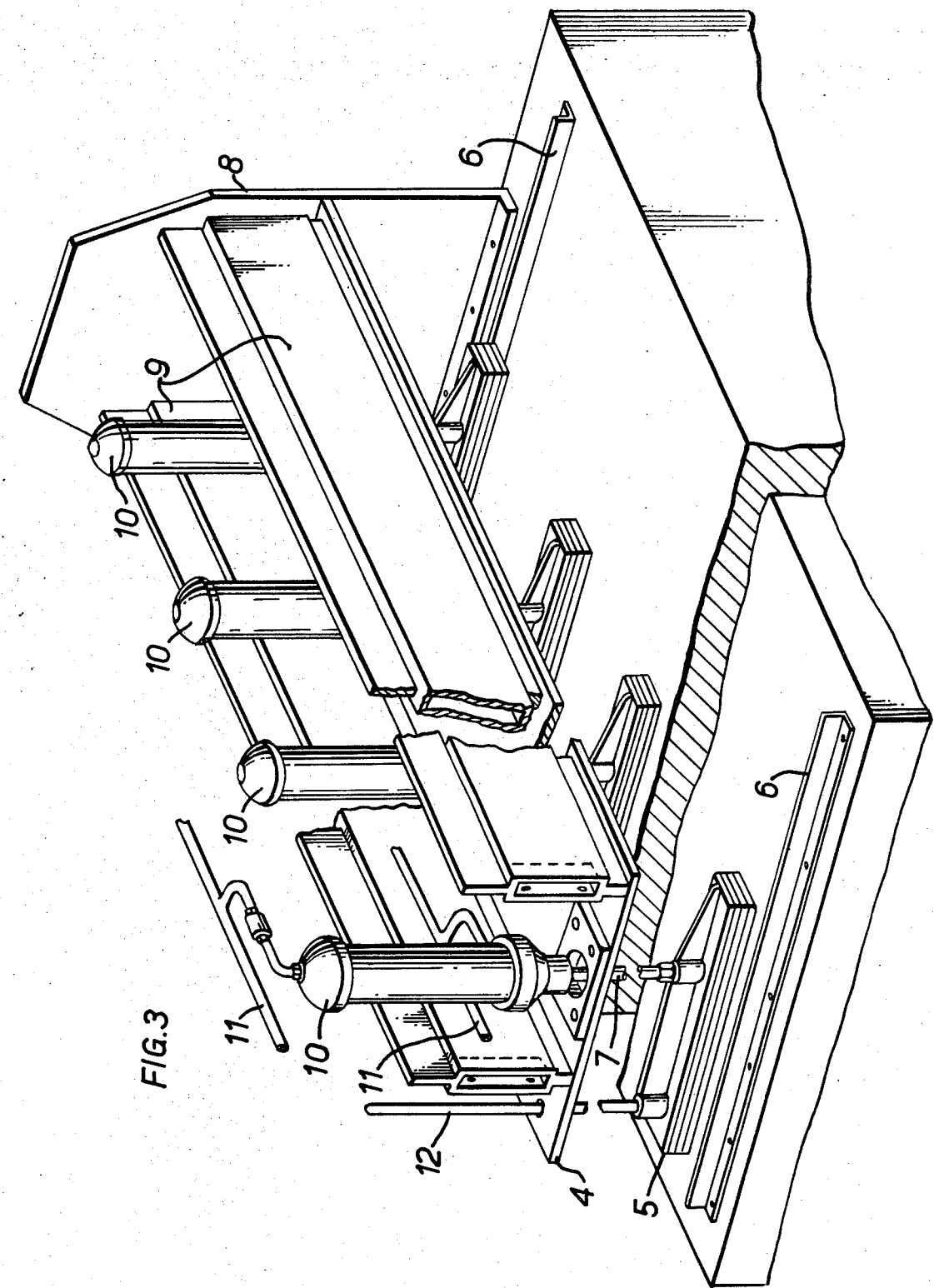
FIG. 3 is a perspective view of the apparatus used to make the carpet shown in FIGS. 1, 2 and 5.

The apparatus shown in FIG. 3 consists of four identical units, mechanically and electrically connected so that the units operate simultaneously. However, if required, one or more units can be isolated.

Each unit comprises a double acting cylinder 10 containing a piston 7 which is operated by air pressure to which is attached a rectangular shoe-plate 5. In a typical example the shoe-plate may be 8½ inches x 2 inches x ½ inch thick. The cylinder 10 is secured to a steel plate 4 supported and attached to end brackets 8 fixed to the base of the apparatus. Members 9 provide reinforcement against the piston thrust and are bolted to the steel plate 4 and end plates 8. Guides 6 are provided for locations of the carpet material.

Compressed air can be supplied to either end of the piston via pipes 11. A flow regulator in the upper circuit controls the piston down-stroke so that it is smooth. A guide rod 12 screwed into the shoe-plate prevents its movements in a horizontal plane but allows vertical movement.

Figure 4:
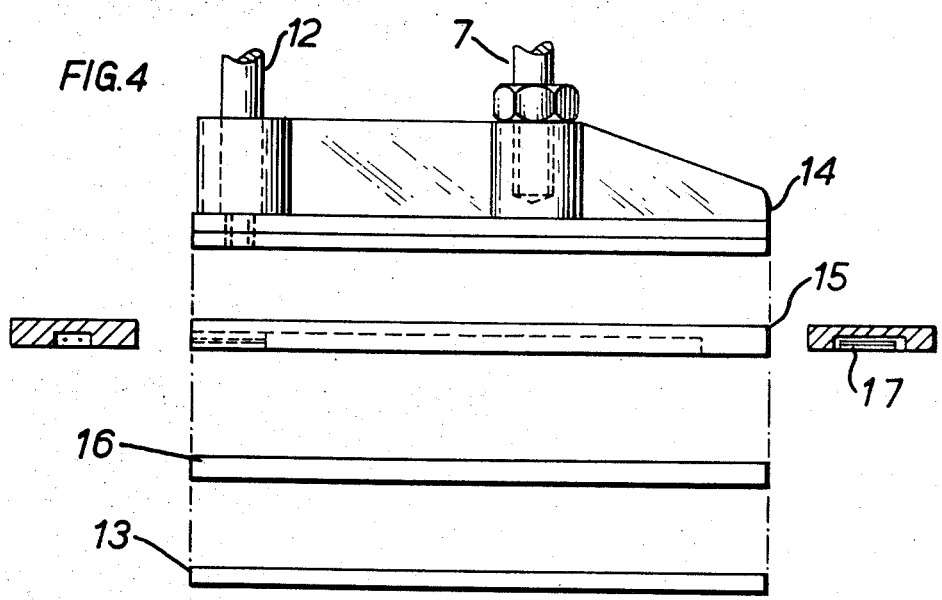
FIG. 4 is an exploded sectional view of the shoe-plate of the apparatus shown in FIG. 3.

FIG. 4 is an exploded sectional view of the shoe-plate 5 which provides the heat and pressure to form the solid nylon layer 3 mentioned above.

The shoe-plate comprises an upper attachment plate 14, an insulating block 15, a steel plate 16 and an aluminium plate 13 which are secured together by set screws. The insulating block is recessed, as shown in the sectional views, to take an infrared heater 17. In operation, heat is conducted via the steel plate to the aluminium plate and the heat balance between steel, aluminium and product is such that continuous operation is possible without recourse to delays to allow the aluminium to reach its working temperature.

The working temperature, air pressure, speed of travel and time of dwell of the piston are all variable and can be independantly set to any predetermined value. Having selected the appropriate combination the operation is fully automatic and no further attention is required. Gauges may be provided on the front panel of the apparatus so that working pressures and temperatures are visible to the operator.

A mesh guard, not shown, may be provided to cover the working area of the apparatus and the latter preferably will not function until the guard is closed, in which position a micro-switch operates and the cycle is started.

Figure 5:
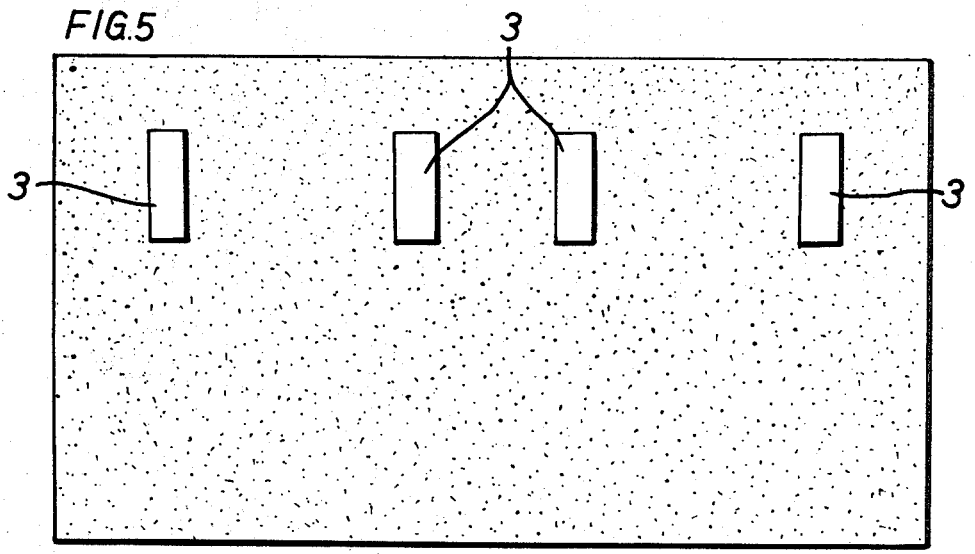
FIG. 5 is a plan view of the finished carpet showing the four wear-resistant areas produced by the apparatus.

The carpet to be treated is located between the guides 6, the positions of which are variable in a horizontal direction; they may be set parallel to one another or at an angle. A back-stop (not shown) positions the carpet in the forward direction and this is also adjustable. The position of the cylinders are also variable and they can be set relative to the guides 6 so that accuracy in location of the wear-resistant areas can be automatically maintained. The finished carpet is shown in FIG. 5 and has four wear-resistant areas 3.

The invention is further illustrated by the following examples which describe the manufacture of car carpets having a pile surface of nylon flock and having wear-resistant areas in that pile surface.

EXAMPLE I

In this example a car carpet comprising a Hessian-backed felt flocked with nylon fibres 3.75 mm. deep was used. The overall dimensions of the carpet were 52 inches x 32 inches and the wear-resistant areas 3 were to be located in the positions shown in FIG. 5.

The air cylinders were fixed so that the shoe-plates were located in the upper or "high" positions. The guides 6 were set at 6½ inches from the edge of the outer shoe-plates, and the back stop was set at 6 inches from the rear edge of the shoe-plates. This is conveniently done with the piston in the down position.

Air pressure to the cylinders was adjusted to 30 p.s.i. and, as the pistons were 2¼ inches in diameter, this represents a pressure of 7 p.s.i. transmitted by the shoe-plate. The timing device was set to give a 15 second dwell period.

The working temperature was set to 227° C. The carpet was positioned between the guides and a strip of silicone-spread glass cloth 50 inches x 10 inches wide x 0.015 inch thick was located, silicone face down, on the nylon pile. This prevents the nylon sticking to the aluminium shoe.

The safety guard was lowered, and the pistons were operated, pressing the shoe-plate assembly onto the covered nylon fibres. The shoe-plates were maintained pressed against the pile surface for 15 seconds, after which the pistons were reversed thereby lifting the shoe-plate assemblies. The safety guard was raised and the carpet removed and placed on one side to cool. A second carpet was then processed, by which time the first carpet had cooled sufficiently for the silicone-spread glass cloth to be removed. This was done and the four wear-resistant areas were revealed as smooth solid nylon films approximately 8½ inch x 2 inch x 1 mm. thick and lying 2.75 mm. below the surface of carpet.

The adhesion of the nylon film to the felt backing was superior to that obtained using conventional materials and methods.

EXAMPLE II

Similarly satisfactory results were obtained using a nylon flocked carpet material having a foam rubber backing.

In the following examples, the apparatus was modified by increasing the size of the shoe-plate to 15 inches x 12 inches and reducing the number of pistons to one.

EXAMPLE III

In this example a car carpet comprising a Hessian-backed felt flocked with nylon fibres 4 mm. deep was used. The overall dimensions of the carpet were 42 inches x 28 inches and a rectangular wear-resistant area was to be produced in its pile 18.

Figure 6:
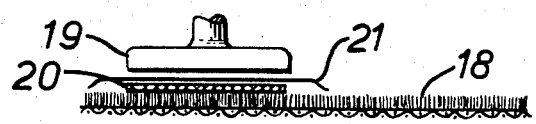
FIG. 6 is a sectional view of a carpet being treated in accordance with the invention.

As illustrated in FIG. 6, the carpet was placed under the shoe-plate 19 and a piece of nylon felt material 20 was located on top of the nylon pile 18 in the area where treatment was required. On top of the nylon felt was placed a strip 21 of silicone-spread glass cloth, silicone face down.

Figure 7:
FIG. 7 is a sectional view of the carpet of FIG. 6 after treatment.

The timing device was set to give a 15 second dwell period and the working temperature was set to 227° C. The piston was operated to press the shoe-plate into contact with the area to be treated for 15 seconds, after which the piston was reversed to lift the shoe-plate. The carpet was then removed and allowed to cool before removal of the glass-cloth. Examination of the treated area showed that the pile of the carpet and the nylon felt had fused together to form one coherent nylon mass 22 of depth equal to the carpet pile, as shown in FIG. 7.

EXAMPLE IV

In this example a black nylon felt material was fused to a brown nylon pile carpet to give a two-colour effect.

Figure 9:
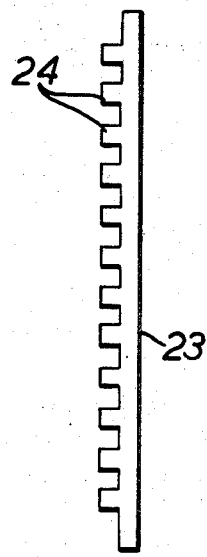
FIG. 9 is an elevational view of the plate of FIG. 8.
Figure 8:
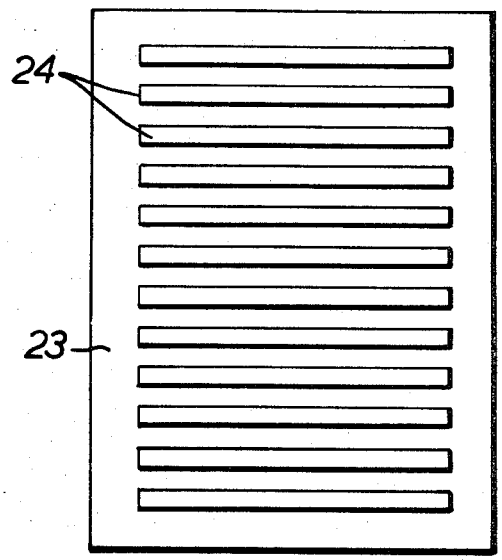
FIG. 8 is a plan view of an aluminium plate used in one embodiment of the invention.
Figure 11:
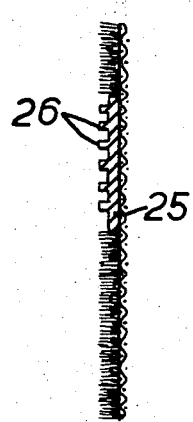
FIG. 11 is a section along the line XI—XI in FIG. 10.
Figure 10:
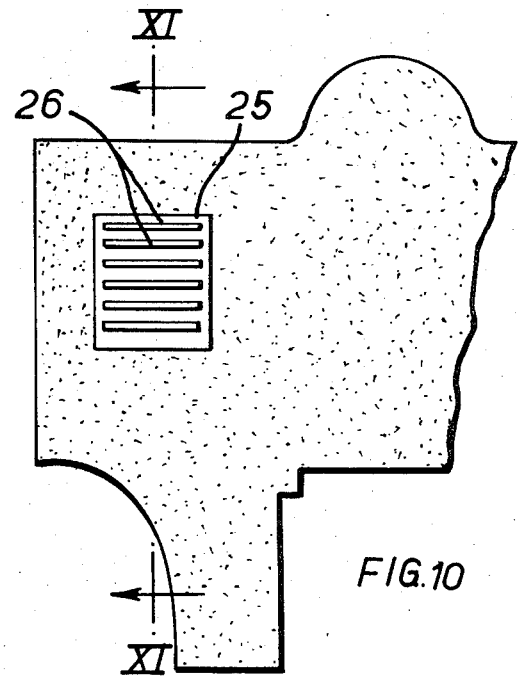
FIG. 10 is a plan view of a carpet treated using the plate of FIG. 8.

The silicone-spread glass cloth was replaced by an aluminium plate 23 with dimensions 15 inches x 12 inches x 3/32 inch thick. This plate had a ribbed surface 24 as shown in FIGS. 8 and 9. The ribbed face was coated by brushing with silicone release fluid and was then placed over the black nylon felt material on the area of the carpet to be treated, the ribs being in contact with the felt material. The overall dimensions of the carpet were 50 inches x 39 inches.

Heat and pressure were applied to the aluminium plate 23 by a shoe-plate as described in the previous example. On removal of the shoe-plate the aluminium plate was left in position on the carpet and was brought into contact with a second shoe-plate located approximately 60 inches from the first. This second shoe-plate was hollow and was water-cooled so that cooling of the aluminium plate was accelerated.

The aluminium plate was then removed and examination of the treated area showed that the carpet pile and nylon felt had fused to form a coherent nylon mass 25 with a ribbed surface 26. The appearance of the carpet was seen to be enhanced by the ribbed pattern and the colour variation between the treated area and the surrounding pile.

Having now described our invention what we claim is:

1. A method of producing a wear-resistant area in a surface-covering material comprising a backing sheet and a pile of nylon flock fibres adhered to said sheet, comprising subjecting said pile to heat and pressure in an area of said pile corresponding to the desired wear-resistant area to fuse the fibres in said area, and then cooling said area to set the fused nylon material in said area.

2. A method according to claim 1, in which a sheet of thermoplastic material is laid on the area of the pile to be treated, whereby when said area is subjected to heat and pressure said thermoplastic sheet and said pile fuse together in said area.

3. A method according to claim 2, in which the sheet of thermoplastic material is a nylon felt.

4. A method according to claim 1, in which heat and pressure are applied to the area of the pile to be treated by means of a heated shoe plate and further wherein an intermediate layer of non-stick heat resistant material is inserted between the area of the pile to be treated and the shoe plate to prevent the flock of fibers of said pile from adhering to said shoe plate.

5. A method according to claim 4, in which the intermediate layer is an aluminium plate having a ribbed surface to produce a ribbed pattern in said wear-resistant area, said surface having a coating of silicone release fluid.

6. A method according to claim 1, in which after cooling the nylon material in the fused area a deposit of nylon powder or nylon flock fibres is sprinkled on said area, said deposit is fused by the application of heat and pressure, and said area is then cooled to set the fused deposit.

7. A method according to claim 6, in which the colour of the deposit is different from that of said fused area.

References Cited

UNITED STATES PATENTS

| 2,384,039 | 9/1945 | Miglarese | 156—306 X |
| 2,981,588 | 4/1961 | Haber | 161—64 UX |
| 3,042,564 | 7/1962 | Hankins | 161—63 |
| 3,052,947 | 9/1962 | Feild Jr. | 28—72 |
| 3,379,604 | 4/1968 | Weber et al. | 161—64 X |
| 3,447,997 | 6/1969 | Kamal | 156—306 X |
| 3,503,838 | 3/1970 | Marshack | 156—306 X |
| 3,518,154 | 6/1970 | Broadhurst | 161—64 |
| 3,523,861 | 8/1970 | Newman et al. | 156—306 |
| 3,576,687 | 4/1971 | Parlin | 156—306 |

REUBEN EPSTEIN, Primary Examiner

U.S. Cl. X.R.

156—306, 279; 28—72; 161—63